Figure 1A:
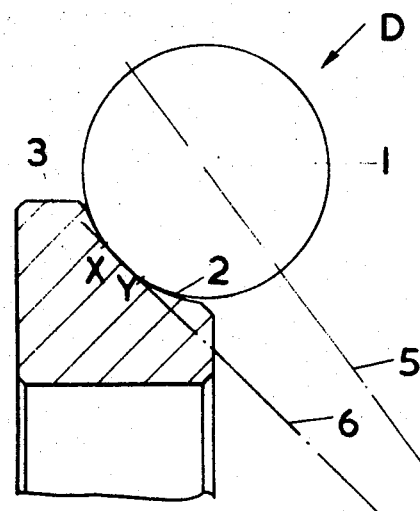

United States Patent

Haines

[15] 3,647,268

[45] Mar. 7, 1972

[54] BALL BEARINGS

[72] Inventor: Derrick John Haines, Swansea, Wales

[73] Assignee: Minister of Technology in Her Britannic Majesty's Government of the United Kingdom and Northern Ireland, London, England

[22] Filed: Apr. 22, 1970

[21] Appl. No.: 30,892

[30] Foreign Application Priority Data

Apr. 22, 1969 Great Britain......................20,397/69

[52] U.S. Cl...........................................................308/193
[51] Int. Cl. .......................................................F16c 33/00
[58] Field of Search...................................308/193, 194, 195

[56] References Cited

UNITED STATES PATENTS

| 1,093,348 | 4/1914 | Mooers | 308/195 |
| 1,310,423 | 7/1919 | Lippert | 308/193 |
| 1,356,444 | 10/1920 | Golden | 308/193 |

FOREIGN PATENTS OR APPLICATIONS 977,603  11/1950  France.....................................308/193

Primary Examiner—Edgar W. Geoghegan
Assistant Examiner—Frank Susko
Attorney—Cameron, Kerkam & Sutton

[57] ABSTRACT

An angular contact ball thrust bearing has its outer race formed in two parts each of which has an arcuate track, the centers of the arcs comprised in the tracks being offset, the profile of the race with which the balls make contact thus not constituting a continuous circular arc. In a substantially unloaded condition each ball makes peripheral contact with the outer race at a point on one track substantially diametrically opposite to a contact point on the inner race. Under operational loading conditions, resultant forces on the balls urge them into peripheral contact with a second point on the outer race on the other track. The two arcs may be of differing radii while the outer race may be in either one or two parts and may include a substantially continuous elliptic arc in place of the two circular arcs.

7 Claims, 11 Drawing Figures

BALL BEARINGS

This invention relates to ball bearings in which axial thrust loads are transferred through the balls from one race to another, and is particularly concerned with angular contact bearings in which a line joining the contact points of a ball and the tracks of the races (usually a diameter) is inclined to a transverse plane normal to the bearing axis.

In gas turbine aeroengines where high-rotational speeds under load are involved, it is particularly the case that bearing life has become a critical factor in further development.

There has been a lack of fundamental knowledge as to the precise motion of balls in races, especially in angular contact thrust bearings. It is possible to calculate the position which balls should occupy in a race by making fairly sweeping assumptions but lack of reliable data on the actual positions under operating conditions has made it extremely difficult to apply such predictions in order to make realistic estimates of ball motion and the angles subtended by the points of contacts between balls and their races have never been accurately known in the past.

Bearings cease to function correctly when flakes of material become detached from the rolling surfaces, or when the tracks of the races and the balls suffer surface damage.

It has been clear that in many cases balls have been sliding in the races rather than rolling freely. This leads to breakdown of lubrication because sliding balls wipe oil away from the contact area whereupon the protective oil film becomes incomplete. Surface asperities are bruised and even become detached thereby changing ball diameter and the track surface condition; balls which have worn to an ellipsoidal shape in which the tracking portion is of smaller diameter are capable of hammering a bearing cage to destruction. The friction accompanying slide can also produce heat and other damaging effects.

It has been widely thought that slide under load primarily occurred at the inner race of an angular contact thrust bearing with little or none at the outer race. It has now been found, as a result of extensive observations of the motion of balls in an actual bearing, that extreme slide occurs at the outer race and is, moreover, a major cause of limited bearing life; the problem is accentuated by the heavy loading at the outer contact point arising from centrifugal forces. Oil films are frequently punctured by asperities on the ball and track surfaces. When this happens the rate at which surface damage occurs is extremely sensitive to contact loading.

The present invention is directed to decreasing outer race contact loadings under operating conditions by the addition of a further contact point whereby the normal outer race contact point is relieved of a considerable proportion of the loading induced by centrifugal forces acting on the balls at high-rotational speeds.

An angular contact ball thrust bearing according to the invention includes a row of balls and an outer race shaped to make contact with each ball at two separate peripheral positions when the bearing is supporting the axial loads for which it is designed and normally operates.

In a preferred embodiment, the profile of the outer race comprises two eccentric circular arcs each in contact with the balls under design load conditions.

The circular arcs may be of the same, or differing radii while the outer race may be constructed in two separate parts.

In another embodiment, the profile of the outer race includes a substantially continuous elliptic arc.

Figure 1B:
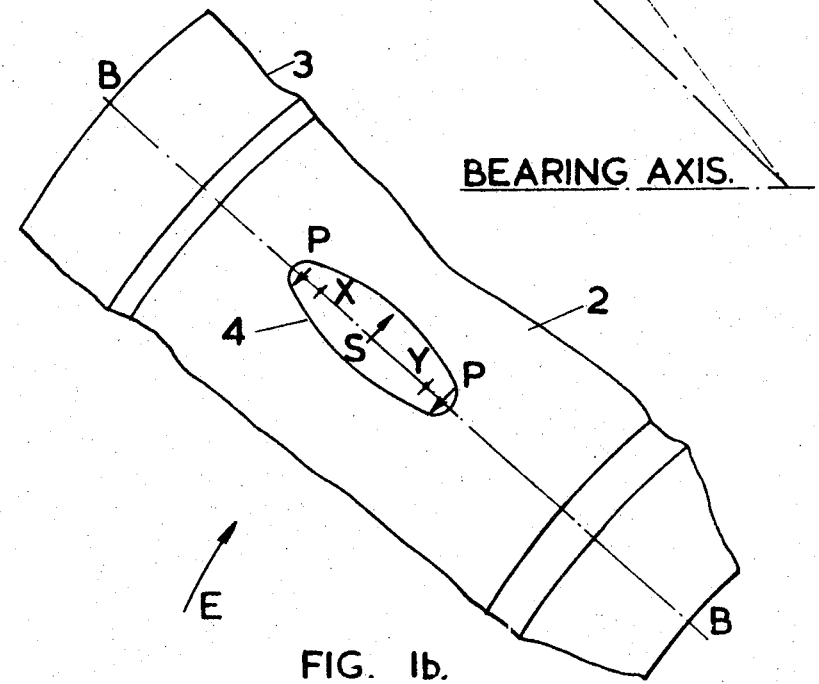
Figure 2A:
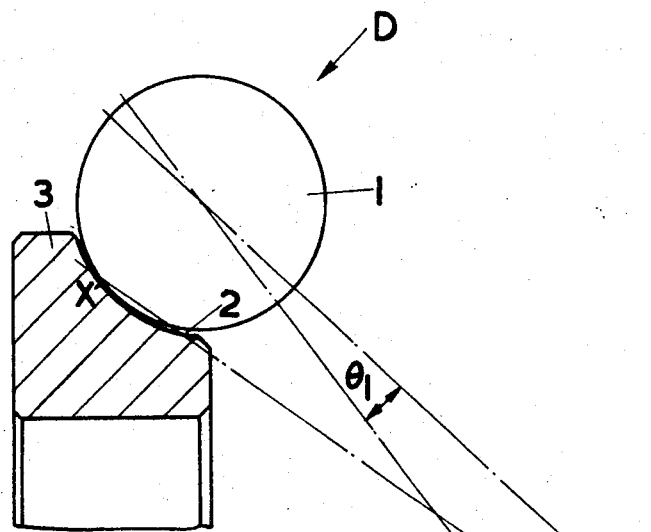
Figure 2B:
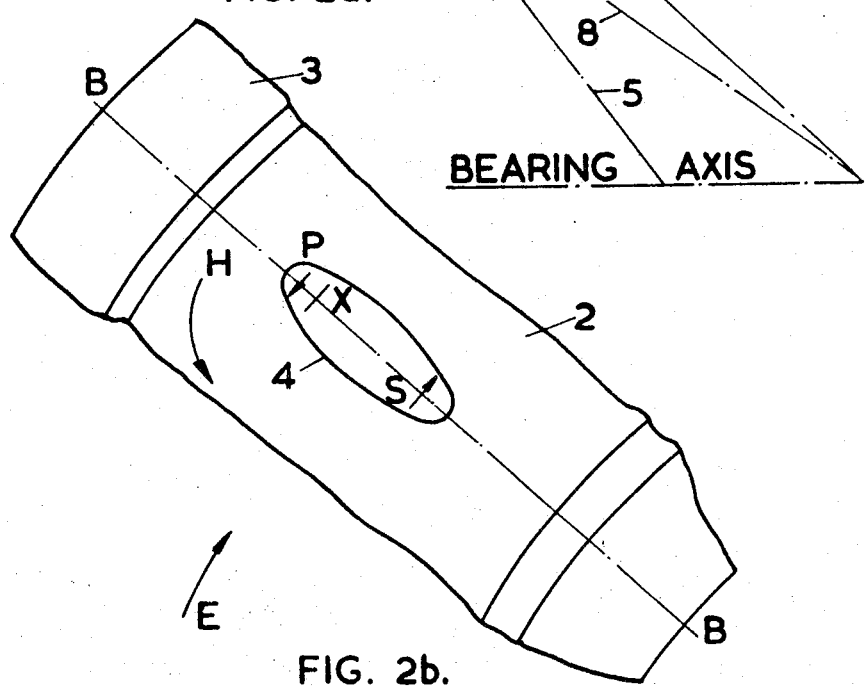
Figure 3:
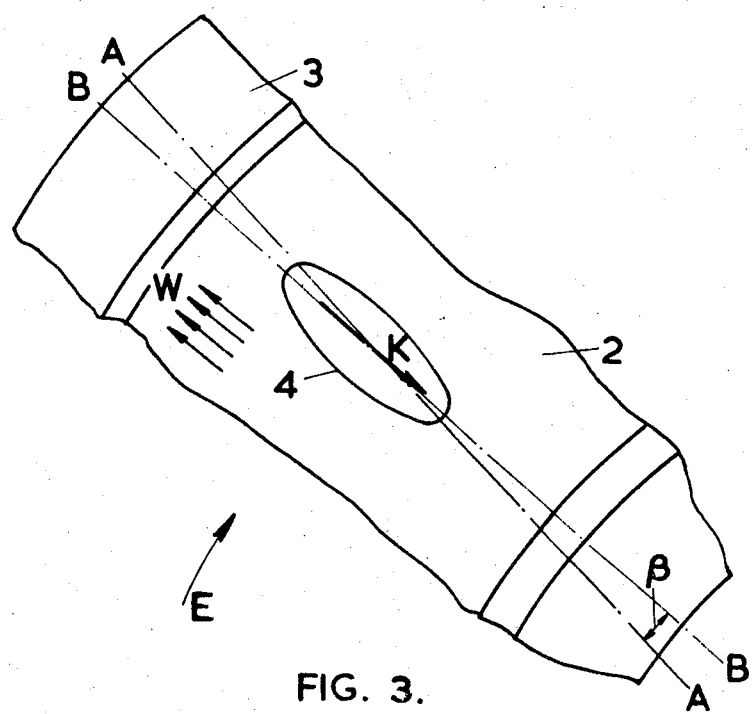
Figures 4A, 4B:
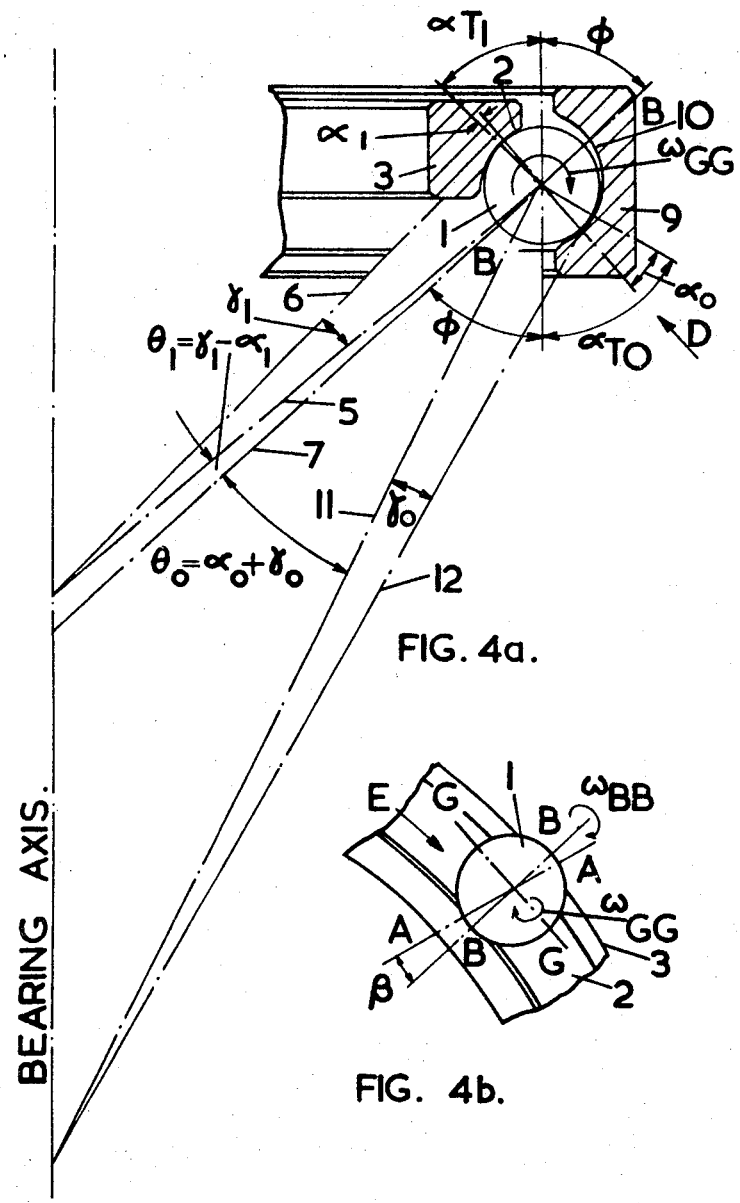

In order that the invention may be more clearly understood, reference will now be made to the accompanying diagrammatic drawings, of which:

FIG. 1a illustrates contact conditions between a ball and a track of a race under simple rolling, FIG. 1b is a view of part of the race of FIG. 1a looking in the direction of the arrow D therein and showing the contact area, FIGS. 2a and 2b are views corresponding to those of FIGS. 1a and 1b respectively under conditions of simple rolling combined with simple spin, FIG. 3 is a view corresponding to FIGS. 1b and 2b under gyroscopic effects, FIG. 4a is an axial section through part of an angular contact ball bearing, FIG. 4b is a view of a ball and part of the inner race of FIG. 4a looking in the direction of the arrow D therein (corresponds to FIGS. 1b and 2b).

Figure 5:
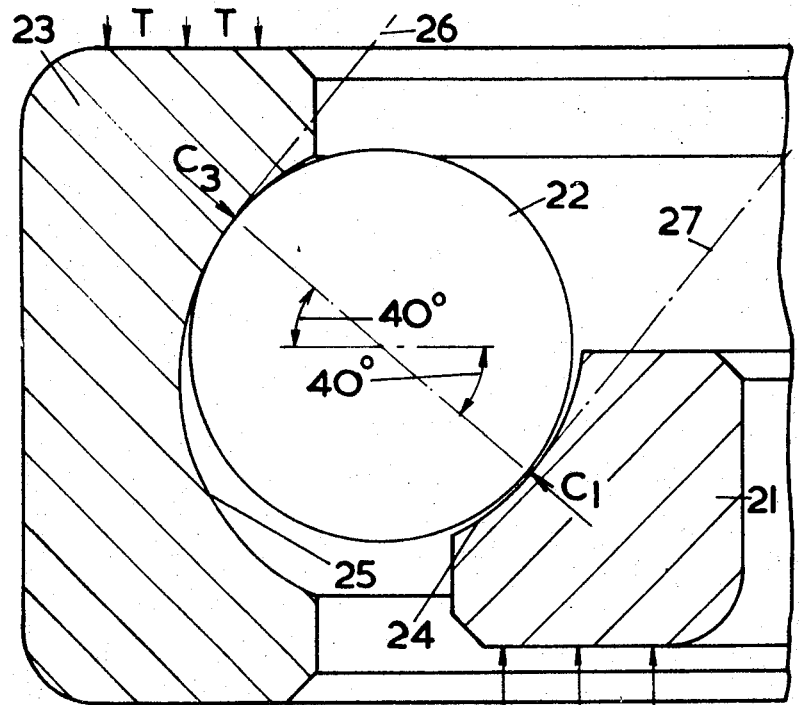
Figure 6:
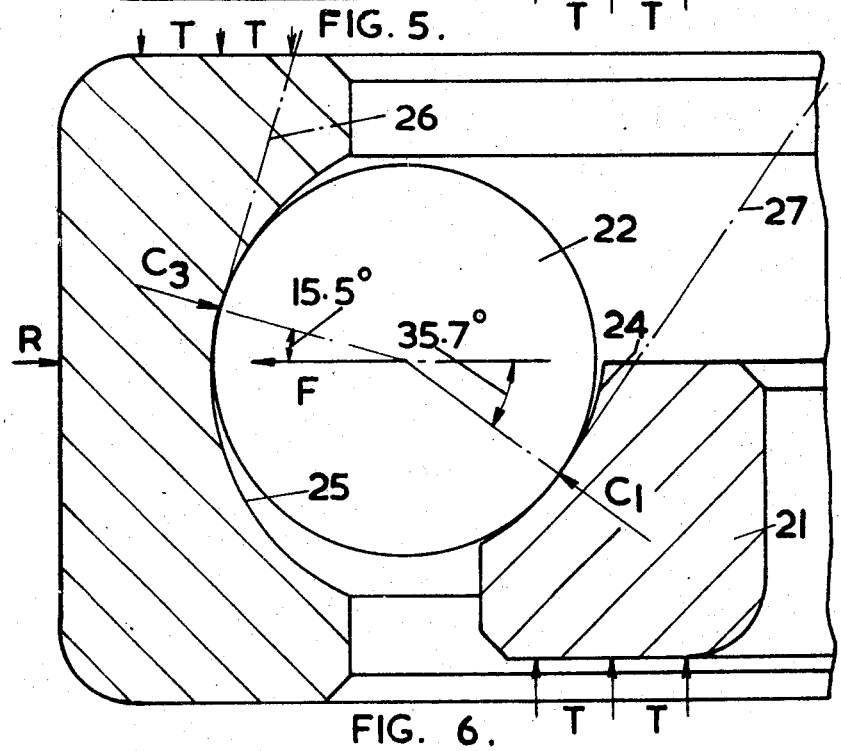
Figure 7:
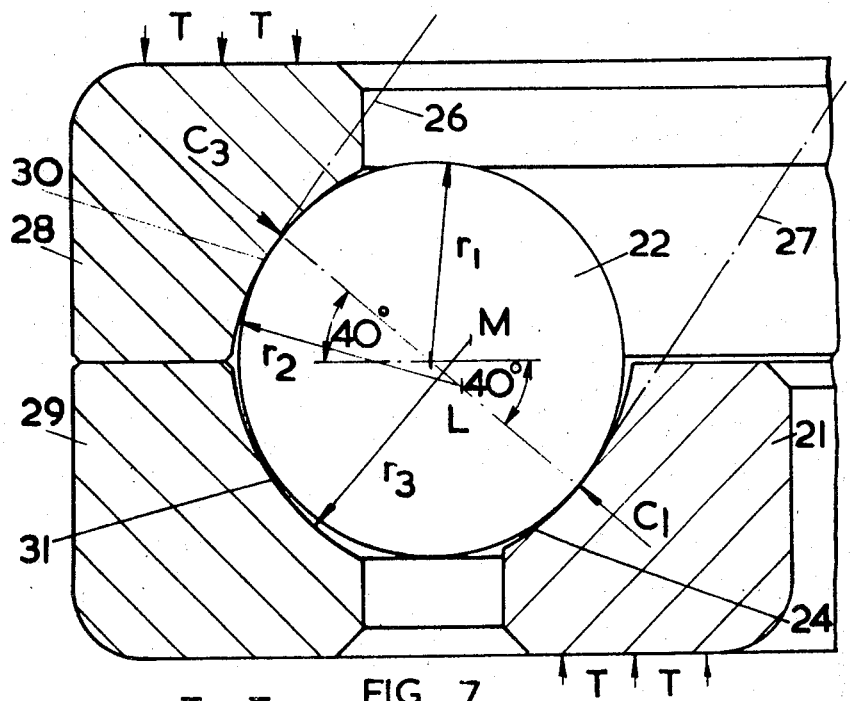
Figure 8:
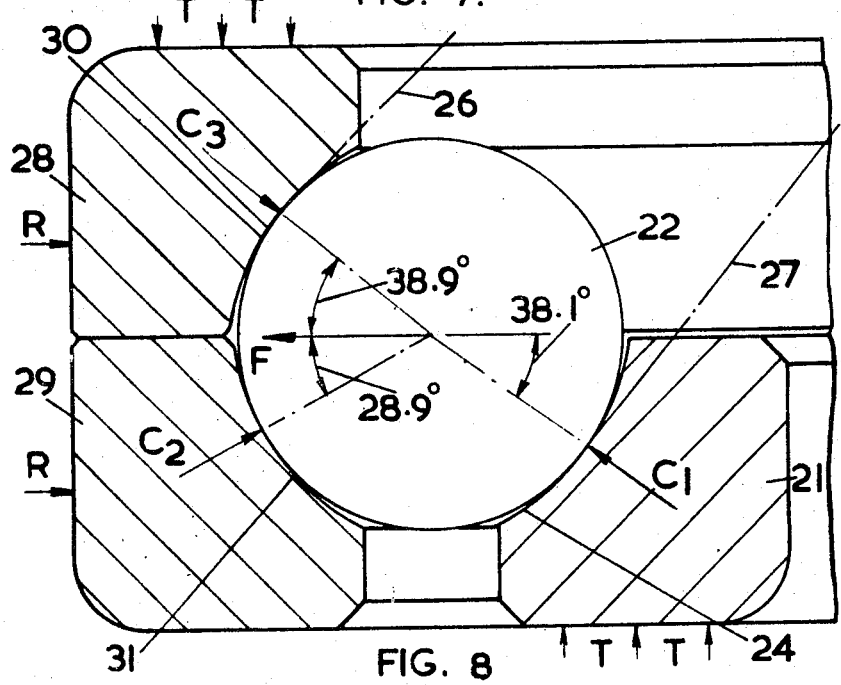

FIGS. 5 and 6 are similar transverse sections through part of a conventional angular contact ball thrust bearing showing the effect of differing operating conditions, and FIGS. 7 and 8 are views corresponding to FIGS. 5 and 6 of an angular contact ball thrust bearing incorporating the invention.

FIG. 1a shows on a large scale a ball 1 in contact with an arcuate track 2 extending round an annular race 3. FIG. 1b shows a contact surface 4 which is formed between the ball 1 (not shown) and the track 2. The contact surface 4 has a finite area due to elastic deformation of the ball and track and is elliptical in shape. Under simple rolling conditions the ball 1 rotates about an axis 5 coplanar with the axis of the bearing of which the ball and race 3 form part (the dotted line BB in FIG. 1b indicates the common plane of the rolling axis 5 and the bearing axis), and behaves on the track virtually as if rolling along a straight groove. Because of the curvature of the track profile, however, the contact surface 4 is not flat and the ball will thus not roll freely at all points within the contact surface. With the track moving relative to the ball in the direction of the arrow E in FIG. 1b, the ball will slide backwards at the center of the contact surface as indicated by the arrow S and slide forwards at the radial (relative to the bearing axis) extremities of the contact surface as indicated by the arrows P, the said slide directions being separated by two lines of nominal pure rolling $x$ and $y$.

In simple rolling a nominal tangent 6 (FIG. 1a) to the ball intersects the rolling axis 5 on the axis of the bearing. The nominal tangent 6 subtends an angle $v_1$ with the rolling axis 5 and cuts the contact surface 4 at points X and Y (FIGS. 1a and 1b) on the lines $x$ and $y$ (FIG. 1b) respectively. If free rolling of the ball 1 is disturbed, for instance by friction between the ball and a cage in which it is carried, then the lines of nominal pure rolling $x$, $y$ (and consequently the points X, Y) will move closer together or farther apart depending on whether the track is a driving or driven (or reacting) member in the bearing assembly.

Spin is a condition when a ball turns or tends to turn about an axis other than its simple rolling axis while rotating between tracks in a bearing.

When simple spin is superimposed on simple rolling there will be displacement of the rolling axis. FIGS. 2a and 2b (in which the same reference letters and numerals as in FIGS. 1a and 1b indicate corresponding features) the ball 1 is rotating in a counter clockwise direction relative to the track 2 according to the view of FIG. 2b, as indicated by the arrow H. Rolling now takes place about an axis 7 which has been displaced relative to the previous rolling axis 5 by an angle $\theta_1$, but remains in the same plane (BB) as before. In FIG. 2b the contact surface 4 is shown as being in the same location as previously thought in practice there might be some slight movement. Displacement of the axis results in nominal pure rolling only occurring along the line $x$, the line $y$ (not shown) now being outside the contact area. A nominal tangent 8 intersecting the rolling axis 7 on the axis of the bearing and cuts the line $x$ at point X (which would not normally be coincident with its position in FIGS. 1a and 1b).

The position of line $x$ and the intercept X is again dependent on effects such as friction between ball and cage and whether or not the track is a driving or driven member. In this case the ball 1 is effectively spinning about the point X and there will be a resultant tendency towards damage to ball and track.

In complex spinning conditions it is likely for there to be no line of nominal pure rolling within the contact surface 4, in which case ball spin will be associated with large tangential sliding velocities between ball surface and track.

Gyroscopic effects generated in balls rotating at high speed around the axis of a bearing can cause inclination of the rolling axis of a ball out of the plane of the bearing axis. Such a condition is indicated in FIG. 3, a rolling axis denoted by the line AA being inclined to bearing axis plane BB by the angle $\beta$. The result is a bodily movement of the ball in question across the track 2 in a sideways direction relative to track movement (transverse slide) as indicated by the arrow K. Nominal simple rolling is not possible and puncturing of an oil film between ball and track will usually result in severe surface damage. The rate of damage is conditioned according to whether or not oil is subsequently "centrifuged" off the surface of the track (in the direction of the arrows W) by track rotation, and if sideways movement of the ball then assists or retards the centrifuging action.

For convenience only a bearing inner race and track has been shown in the foregoing Figures but comparable conditions exist between a ball and the outer track of a bearing. FIGS. 4a and 4b show a conventional angular contact ball bearing setting out the principal parameters affecting ball behavior in relation to the tangents at ball to track contact surfaces. The same conventions, reference letters and numerals are used as previously in relation to corresponding features. In addition, an outer race 9 having an arcuate track 10 results in a rolling axis 11 which corresponds to the rolling axis 5 shown in relation to the inner race 3 in FIG. 1a, and a nominal tangent 12 subtending an angle $\nu_0$ to the rolling axis 11 in similar fashion.

The notation used in FIGS. 4a and 4b which is consistent with that in previous Figures where appropriate, is as follows:

- AA    typical ball rolling axis at high-ball rotational speeds
- BB    ball rolling axis coplanar with bearing axis
- GG    ball translation axis
- $\alpha_1 \alpha_0$    angles defining ball spin at inner and outer track contact surfaces
- $\alpha T_1, \alpha T_0$    inclination of tracking bands to the bearing axis ($=90°$—contact angle)
- $\beta$    inclination of ball rolling axis between AA and BB arising from gyroscopic effects and causing ball slide across the bearing tracks (i.e., transverse slide)
- $\nu_1 \nu_0$    angles defining simple rolling at inner and outer track contact surfaces
- $\phi$    inclination of ball-rolling axes to the bearing axis
- $\theta_1 \theta_0$    displacement of ball-rolling axes due to spin ($\theta_1 = \nu_1 - \alpha_1$; $\theta_0 = \alpha_0 + \nu_0$)
- $\omega_{BB}, \omega_{GG}$    components of ball angular speed about orthogonal axes in the rolling plane of the ball: $\omega_{GG}$ being due to $\beta$ and $\omega_{BB}$ the nominal rolling speed of the ball.

Ball spin and transverse slide conditions as described in relation to FIGS. 2a and 2b and FIG. 3 respectively can be conveniently specified for both inner and outer tracks:

$$\text{Spin ratio} \left(\frac{\text{Spin Angular Velocity}}{\text{Ball Rolling Angular Velocity}}\right)$$

$$= \tan \theta_1 \text{ at inner track}$$
$$\text{and } \tan \theta \text{ at outer track}$$

$$\text{Transverse slide ratio} \left(\frac{\text{Velocity of slide}}{\text{Ball Rolling Velocity}}\right)$$

$$= \frac{\omega_{GG}}{\omega_{BB} \cos \alpha_0} = \frac{\tan \beta}{\sin (\phi + \alpha T_0)} \text{ at inner track}$$

$$\text{and } \frac{\tan \beta}{\sin (\phi + \alpha T_1)} \text{ at outer track}$$

The only complete theoretical analyses of ball behavior have hitherto assumed that the motion of a ball is controlled by a state of simple rolling at the outer contact surface (outer race control) with $\beta = \theta_0 = 0$, a state of simple rolling at the inner contact surface (inner race control) with $\beta = \theta_1 = 0$, or a state of control in which $\beta = 0$ and both $\theta_1$ and $\theta_0$ are positive angular quantities (sometimes called "shared race control").

It can now be shown that these assumptions, which form the basis of current bearing design, are invalid under high-speed race usage conditions because the gyroscopic couple acting on a ball can generate a $\beta$ value which causes $\omega_{GG}$, and a slow rotation of the ball in the centerline plane of the bearing with the result that cage speed, which customarily has been used in postulations as to the nature of the control existing, appears to approach that for an inner race control condition. However, the value of $\theta_1$ falls and probably changes sign so that the concept of ball control at one or other of the two contact points, or the concept of a stable condition with both $\theta_1$ and $\theta_0 > 0$ is not valid. Experiments show quite clearly that the condition is associated with a definite transverse sliding of the ball at the inner race contact points, to all intents and purposes independent of thrust loads over a wide range.

In FIGS. 5 and 6, an angular contact ball thrust bearing comprises in coaxial relationship an inner race 21, a row of balls (of which one is shown at 22) and an outer race 23. The races 21, 23 have arcuate tracks 24 and 25 which respectively make contact with the balls at opposite pints on the surfaces thereof; each of the tracks 24, 25 is constituted in profile by a continuous circular arc.

FIG. 5 shows a typical loading where the balls are stationary around the axis of the bearing. Thrust forces, indicated by the arrows T, acting on the races in an axial direction are transmitted through the balls, via contact surfaces indicated by the arrows $C_1$ and $C_3$, along a ball diameter which is inclined relative to the axis of the bearing. The loadings at the contact surfaces are balanced and tangents from the contact surfaces, indicated by the chain dotted lines 26, 27, and which indicate the positions of the respective rolling axes, are parallel with each other. This means that the balls will roll with shared control at both the inner and outer contact surfaces with one or both races rotating at slow speed about the bearing axis.

At high-rotational speeds (such as are likely to be experienced in gas turbine aeroengines under normal operating conditions), high-centrifugal forces will be generated in the balls. These forces act radially outwards relative to the bearing axis and cause the balls to sit deeper in the outer race with the result that the contact surface $C_3$ is displaced as shown in FIG. 6. There will be some displacement of the contact surface $C_1$ on the inner race also.

Thrust forces together with radial loading (as indicated by the arrow R) and gyroscopic effects generated by the rotation of the balls about the axis of the bearing are transmitted through the balls to produce an unbalanced force and couple system giving both ball spin and simultaneous transverse ball slide.

In a bearing having steel balls at a pitch circle diameter of 6.484 in., a stationary outer race, an inner race speed of 20,000 rev./min, a nominal ball diameter of 0.750 in., and a conformity ratio of balls to tracks of 97.3 percent, observed experimental values with a thrust load T of 250 $lb_f$ per ball were; centrifugal force, indicated by arrow F, of 563 $lb_f$ per ball, an inner track loading at contact $C_1$ of 431 $lb_f$, and an outer track loading at contact $C_3$ of 947 $lb_f$. The tangents 26, 27 are not now parallel and consequently extreme ball spin (with resultant ball and track damage) and, due to inclination of the ball-rolling axes out of the plane of the bearing axis, extreme ball slide will occur at the heavily loaded outer track (affecting both ball and track).

In the bearing shown in FIGS. 7 and 8, in which the same reference numerals are used as in FIGS. 5 and 6 to indicate corresponding integers, the inner race 21 and balls 22 are substantially the same as in FIGS. 5 and 6. The outer race, however is in two parts 28, 29 which are disposed symmetrically about a transverse plane extending radially from the bearing axis. Each of the parts 28, 29 has an arcuate track, 30, 31 respectively, whose radii, $r_2$, $r_3$, are greater than that, $r_1$, of the balls and are struck from noncoincident centers L,M, the tracks thus not constituting a continuous circular arc.

In FIG. 7, where the operating conditions correspond to those of FIG. 5, thrust is transmitted between the inner race 21 and the part 28 of the outer race through contact surfaces $C_1$ and $C_3$ in similar fashion, and simple rolling conditions likewise exist at the contact surfaces so that there is almost no surface rubbing (and wear) at these points. Normally under these conditions there will be no contact between the balls and the track 31. Any ball spin occurring in the event of such contact should, however, be at a nondamaging load level.

At high-rotational speeds, such as are experienced in gas turbine aeroengines, centrifugal forces generated in the balls will result in them sitting deeper in the outer race as before when contact will be made with track 31 in the part 29 at $C_2$, as shown in FIG. 8. The effect of this is to counteract the unbalance tending to displace the rolling axis and maintain the contact surface $C_3$ in approximately the same location on its track throughout. Within the design operating range, the contact surfaces $C_2$, $C_3$ will be approximately midway along the respective tracks, the resultant loading giving a substantially balanced force and couple system with the net result that the contact surfaces $C_1$, $C_3$ are displaced only slightly from the positions they occupy in the slow speed case (FIG. 7) and thrust forces continue to be transmitted substantially diametrically through the balls with the tangents 26,27 to the contact surfaces parallel to each other, or even slightly convergent. There will be ball spin at all three contact surfaces but little or no slide will occur between the inner race 21, the part 28 and the balls.

In an observed test situation where dimensions and operating conditions corresponded with those described in relation to FIG. 6, contact loads recorded were respectively $C_1$—437 $lb_f$, $C_2$—408 $lb_f$ and $C_3$—722 $lb_f$ at 20,000 rev./min.

A comparison of energy generation for the above example and that of FIG. 6 shows that the total energy generation by friction is reduced to approximately half where three-point contact occurs in the operating condition, a major reason for the decrease being the reduction in loading at contact surface $C_3$ and a consequential increase in the efficiency of lubrication.

Conformity ratios of balls to tracks (conformity ratio=ball radius/track radius) are normally between 85 and 99.5 percent. High-conformity ratios reduce contact stresses but (in the presence of spin at a contact surface) can increase the possibility of damage to balls and track because of the larger contact areas involved and some compromise value is usually adopted.

As has already been indicated, the thrust carrying contact surfaces $C_1$, $C_2$ do not significantly change position with variation of operating condition. For example, with balls of the order of 1 in. diameter and conformity ratios of the order of 90 to 95 percent, the angles subtended by the said contact ball points to ball diameters extending radially from the bearing axis would not be expected to change by more than 10° at inner race speeds from 0 to 20,000 rev./min with thrust loads of up to 1,000 lb. per ball.

This compares with a displacement in the angle of an outer race contact surface ($C_3$) of 20 percent or more in conventional bearings such as in FIGS. 5 and 6, with more than 10 percent variation in the angle of an inner race contact surface ($C_1$).

The angle subtended by the third contact surface ($C_2$), however may change under load.

In general, the radii of the tracks 30, 31 ($r_2$, $r_3$) shown in FIGS. 7 and 8 will be the same but it can be envisaged that these could differ. One or both tracks can contain more than one arc form and the distance from a bearing centerline to the center L (FIG. 7) may differ from the distance between the bearing centerline and the center M.

The outer race shown in FIGS. 7 and 8 is formed in two parts but this is primarily for ease of manufacture and is not essential, the race can be in one piece provided that those portions of the track at which the two contact surfaces $C_2$, $C_3$ occur is not a continuous circular arc. In one embodiment having a one-piece outer race there are two tracks defined by two eccentric circular arcs substantially as described in relation to the split outer race of FIGS. 7 and 8 while a continuous elliptic arc is used in another embodiment.

The present invention goes counter to established teaching in bearing design in requiring ball contact at two points on the outer race of an angular contact thrust bearing in operating conditions. What are termed three-point and four-point contact bearings are well-known but these names are only true in the static case or when under purely radial loading. It has always been specified that there will be only one point of contact at the inner and outer races when thrust loads are applied.

The use of split races for ease of assembly is fairly common practice and advantage is frequently taken of this in removing a small amount of material from the adjacent faces to effect a reduction in end float such as occurs with reversal of thrust in a bearing required to support axial thrust loads in two directions. The loadings applied have hitherto not been of such magnitude as to give other than two-point contact between balls and races under design operating conditions. Should three-point contact occur, this would only be because of excessive loading such as would be likely to cause failure, or malfunction of the bearing. In fact, indications are that operation with a significantly loaded third contact surface at relatively low-shaft rotational speeds is at least unwise.

What I claim is:

1. An angular contact ball thrust bearing comprising a row of balls disposed between inner and outer races, in which the outer race comprises two ball-contacting tracks of arcuate form so arranged that under axial loading alone each ball is in peripheral contact at only two substantially diametrically opposite points with the inner race and one track of the outer race respectively, a line joining said contact points being inclined to a transverse plane normal to the bearing axis, and the outer race is so shaped that an increase in centrifugal force on the balls causing displacement of the aforesaid contact points acts to bring each ball into peripheral contact at a third point with the second track of the outer race at a predetermined loading corresponding to the operational rotational velocity of the bearing, forces generated by ball contact with the second track acting to counteract displacement of ball contact points with the first-mentioned track.

2. An angular contact ball thrust bearing according to claim 1 in which the ball contact points on the two tracks of the outer race are disposed on opposite sides of a transverse plane extending through the center lines of the balls.

3. An angular contact ball thrust bearing according to claim 1 in which forces generated in the outer race due to ball peripheral contact with the second track act in opposition to gyroscopic effects resulting from ball rotation about the bearing axis and tending to displace a ball rolling axis from the instantaneous axial plane extending through the bearing axis and the center of the ball.

4. An angular contact ball thrust bearing according to claim 1 in which the profile of each track is a circular arc and the arcs of the two tracks are eccentric.

5. An angular contact ball thrust bearing according to claim 1 in which the profile of the outer race is a substantially continuous elliptic arc.

6. An angular contact ball thrust bearing according to claim 1 in which the outer race is constructed in two separate parts, one part being in contact with the periphery of each ball at all material times.

7. An angular contact ball thrust bearing according to claim 1 in which the outer race is constructed in two parts and one track is formed on each part.

* * * * *